April 2, 1963 J. G. GALE 3,083,991
ROPE THIMBLE
Filed March 27, 1961 2 Sheets-Sheet 1

INVENTOR.
JAMES G. GALE
BY
Fishburn & Gold
ATTORNEYS

April 2, 1963  J. G. GALE  3,083,991
ROPE THIMBLE
Filed March 27, 1961  2 Sheets-Sheet 2

INVENTOR.
JAMES G. GALE
BY
Fishburn & Gold
ATTORNEYS

United States Patent Office 3,083,991
Patented Apr. 2, 1963

3,083,991
ROPE THIMBLE
James G. Gale, Kansas City, Mo., assignor to Newco Manufacturing Company, Inc., Kansas City, Mo., a corporation of Missouri
Filed Mar. 27, 1961, Ser. No. 98,526
7 Claims. (Cl. 287—81)

This invention relates to rope fittings, and more particularly to a thimble or the like for use with rope in making rope eyes, slings or other rope load handling devices.

The principal objects of the present invention are to provide a sectional rope fitting such as a thimble whereby the thimble sections may be separated for application or removal from structures such as continuous loops or links; to provide such a thimble structure wherein the sections have mating end portions with fastening means for securing same together in relative alignment and cooperating with a rope thereon to hold the sections in assembled position; to provide such a fitting wherein the mating portions of the sections have cooperating surfaces whereby forces applied thereto through a rope and load device connected therewith aid the fastening devices in holding the sections together and the forces applied thereto are transmitted through substantial areas or portions of the structure so as not to concentrate such forces on the fastening devices; to provide such a sectional thimble with mating end portions having engagement to prevent lateral relative movement of the sections; and to provide a thimble structure that is of relatively great strength and resistance to change in form and that is simple and economical to manufacture and efficient in use.

Other objects and advantages of this invention will become apparent from the following description taken in connection with the accompanying drawings wherein are set forth by way of illustration and example certain embodiments of this invention.

Figure 1:
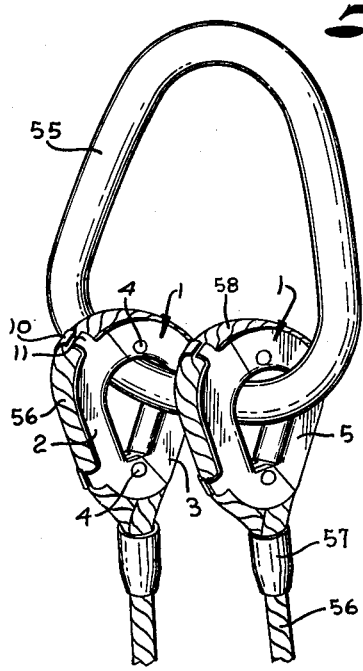
FIG. 1 is a perspective view of rope thimbles embodying the features of the present invention forming the ends of a sling and attached to a link.
Figure 3:
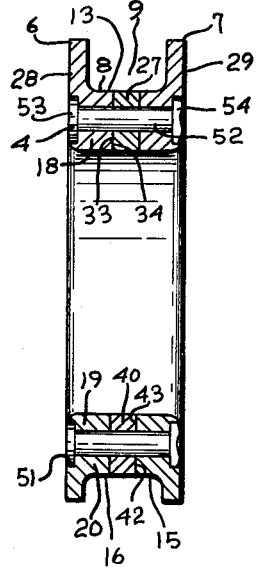
FIG. 3 is a sectional view through the rope thimble taken on the line 3—3, FIG. 2.
Figure 6:
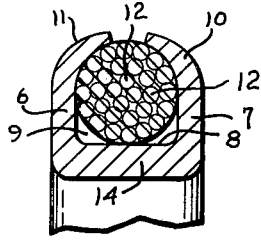
FIG. 6 is a partial sectional view similar to FIG. 5 with rope retaining lugs engaged with a rope on the thimble.

Referring more in detail to the drawings:

The numeral 1 generally designates a rope fitting such as a thimble having separable sections 2 and 3 secured together in assembled relation by suitable fastening devices 4. The fitting sections 2 and 3, when assembled, cooperate to form a thimble body 5 having laterally spaced outwardly extending flanges 6 and 7 cooperating with a peripheral surface 8 of the body between said flanges to define a rope receiving channel or groove 9. Opposed lugs 10 are arranged on the flanges 6 and 7 and integral therewith and extend outwardly therefrom, said lugs being spaced around the periphery of the thimble and adapted to be bent over as at 11, as illustrated in FIGS. 1 and 6, to retain a rope 12 in the rope receiving groove 9. The upper portion of the thimble is in the form of a circular arc with the respective peripheral surface portion 13 of the body being an arc which extends to straight portions 14 that converge to provide a narrower or lower end 15 which has a circular arc periphery 16 at the lower end of the groove 9. The body 5 has an eye or opening 17 extending transversely through the fitting. The portion of the body at the upper end that forms the bottom wall of the rope receiving groove 9 is relatively thick as at 18 and progressively becomes thinner to the straight portions 14 at the sides and then becomes thick again at the lower portion as at 19, with the flanges arranged whereby the rope receiving channel extends completely around the periphery of the fitting. It is preferable that pairs of lugs 10 be arranged adjacent the lower ends of the straight side portion and that other pairs be arranged in spaced relation in the upper circular arc portion to provide substantialy equally spaced rope engaging members, as illustrated in FIG. 1.

The sections 2 and 3 are separable with the end portions being in the thicker areas of the body forming the bottom wall 20 of the rope receiving channel, said areas being at the upper and lower parts of the thimble with interengaging portions and contacting surfaces to resist loads and retain the sections in position without lateral or vertical shifting of one relative to the other. It is preferred that the ends of the sections be arranged wherby one of each of the mating end portions has a bifurcated end 21 and the other of the mating end portions has a tongue 22 extending into the bifurcated portion. While the bifurcated end 21 and tongue 22 may be arranged as desired at the mating ends, in the illustrated structure the upper end of the section 2 has an end face 23 in a transverse plane in angular relation to a central transverse plane designated by the line 24, the plane of the face 23 being radial relative to the axis 25 of the circular arc of the upper peripheral face portion forming the bottom of the rope receiving channel 9, whereby the face 23 is spaced from the plane 24. The upper end of the section 3 terminates in an end face 26 in a corresponding plane to the face 23 whereby when assembled the faces 23 and 26 mate and engage. The section 2 has a tongue or extension 27 preferably substantially midway between the side faces 28 and 29 of the sections, said tongue 27 terminating in an end face 30 in a plane transverse to the thimble and in a corresponding angular relation to the central plane 24 as the angular relation between said plane 24 and the face 23. The upper end portion of the section 3 is bifurcated by a slot 31 extending therein longitudinally of the rope receiving channel, said slot 31 having a width substantially corresponding to the width of the tongue 27 and terminating in an inner end 32 to provide a face adapted to be engaged by and mate with the end face 30 of the tongue 27 whereby when the sections are assembled the side faces 33 of the tongue engage the side faces 34 of the bifurcated end of the section 3 defining the slot 31 and the end face 30 of the tongue engages the end 32 and the face 23 engages the face 26, all in mating corresponding engagement.

Figure 2:
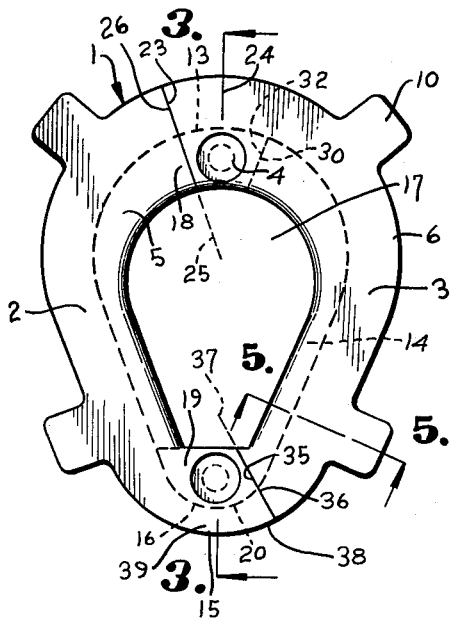
FIG. 2 is a side elevation of the rope thimble.
Figure 4:
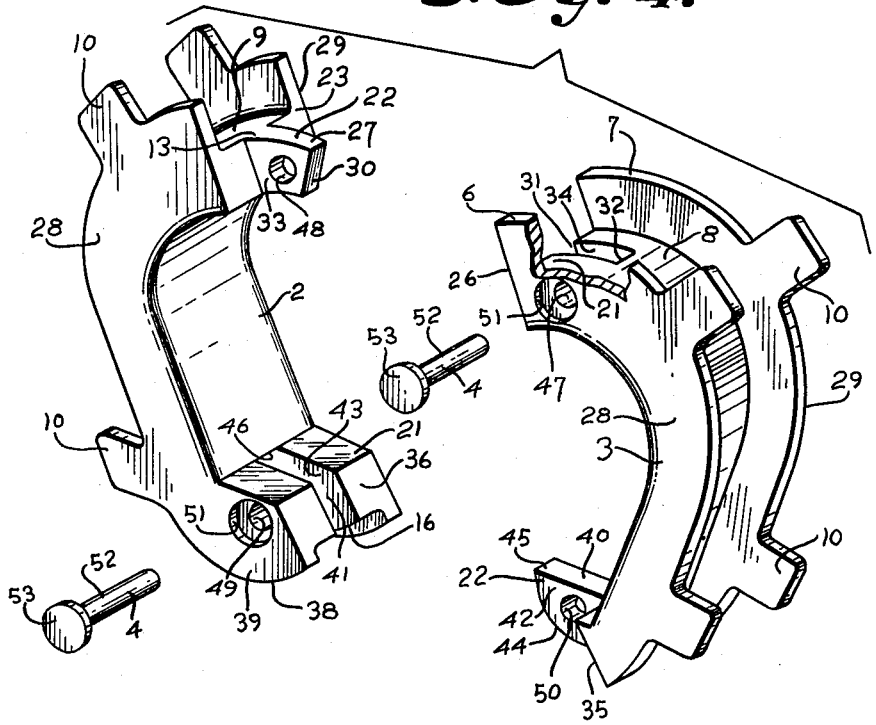
FIG. 4 is a disassembled perspective view of the rope fitting with portions broken away to illustrate the structure thereof.
Figure 5:
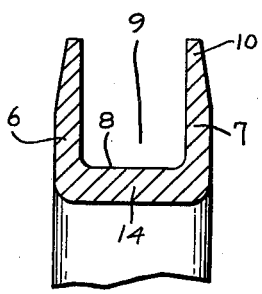
FIG. 5 is a partial sectional view through the rope fitting taken on the line 5—5, FIG. 2, with rope retaining lugs in extending position.

The lower end of the section 3 terminates in a plane transverse to the thimble to define an end face 35 adapted to be engaged by and mate with an end face 36 of the lower end of the section 2, said face 35 and 36 being in a transverse plane in angular relation to the plane 24, said plane preferably intersecting at a point 37 which is preferably the axis of the periphery 38 of the arcuate portion 39 of the flanges 6 and 7 at the lower end of the thimble. The lower end of the section 3 has a centrally disposed tongue or extension 40 extending from the face 35 longitudinally relative to the rope receiving channel, said tongue being adapted to extend into a slot 41 forming a bifurcated lower end of the section 2, the slot and tongue substantially corresponding in width whereby the side faces 42 engage the side faces 43 formed by the bifurcated end when the sections are assembled. The lower or outer periphery 44 of the tongue 40 corresponds to the lower periphery of the bottom of the rope receiving slot or channel, and the outer upper portion 45 of the tongue is adapted to engage the surface 46 at the upper portion of the slot 41 in the section 2, as illustrated in FIGS. 2 and 4.

When the sections 2 and 3 are assembled, suitable fastening devices 4 engage the sections through the thickened portions of the body at the upper and lower parts of the sections and, in the illustrated structure, the bifurcated portion of the section 3 has bores 47 extending therethrough in registry with a bore 48 in the tongue 27 and the lower bifurcated end of the section 2 has bores 49 extending therethrough and in registry with a bore 50 extending through the tongue 40. The outer portions of the bores 47 and 49 preferably are counterbored as at 51 whereby a suitable fastening device such as a rivet may be arranged with the shank 52 thereof extending through the registering bores with a head 53 positioned in the counterbore and with the other end suitably secured as by peening to form a second head or enlarged portion 54 to secure the sections together, the head 53 and the enlarged portion 54 being in the counterbores whereby they do not extend outwardly beyond the side surfaces 28 and 29 of the thimble.

When it is desired to use a thimble constructed as described, and with the sections disassembled, they may be arranged on a loop or link such as a pear-shaped link 55 by placing the sections 2 and 3 on opposite sides of the link and moving same together whereby a portion of the link extends through the opening 17 of the thimble. The sections are moved together with the tongues 27 and 40 extending into the slots 31 and 41 respectively and then the fastening devices 4 are inserted into the respective bores and secured to hold the sections firmly together. A suitable rope 56 is then placed in the rope receiving channel 9 and the ends secured in a suitable manner such as by ferrules 57 to form eyes 58 extending around the thimbles. The lugs 10 are then bent over the rope to hold the rope in the rope receiving channel, as illustrated in FIGS. 1 and 6. The structure is then ready for use.

The surfaces 23 and 26 are at an opposite angle to the central plane 24 to that of the surfaces 30 and 32 to cooperate to prevent relative vertical movement of the section. In the same manner, the surfaces 45 and 46 and the angular arrangement of the surfaces 35 and 36 also cooperate to prevent relative vertical movement and thereby resist any tendency of any forces acting on the thimble to move one section relative to the other. These surfaces cooperate with the eye of the rope extending around the thimble whereby the force is applied by the rope and by the load supporting member or link 55 whereby the sections are retained in position and cooperate to provide a strong, sturdy load-supporting structure.

When it is desired to remove a thimble, the rope is removed therefrom and the fastening devices such as the rivets removed from the sections, and then the sections may be separated and taken from the link and applied to other load-supporting devices as desired, said thimbles being reassembled in the manner above described.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:

1. A split loop rope thimble comprising, a plurality of rope supporting sections, each section having an outwardly facing rope receiving channel therein, said sections having mating ends with the rope receiving channels at said ends in registry and with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections and the tongue and slot having faces in transverse planes in angular relation and diverging outwardly of the rope receiving channel, and means extending transversely of the sections at the tongues and detachably securing the sections together, said securing means being spaced inwardly from said rope receiving channels.

2. A split loop rope thimble comprising, two rope supporting sections, each section having an outwardly facing rope receiving channel therein, said sections being cooperable to form a loop thimble with sides converging toward one end of the thimble to provide a narrower end thereof, said sections having mating ends with the rope receiving channels at said ends in registry and with a slot extending from a section end longitudinally of the respective rope receiving channel, a tongue extending from the other section end of the mating ends and into the respective slot, the free end of said tongue having mating engagement with the terminal end of the slot, said tongue and slot having opposed substantially parallel engaging sides to retain the sections against relative lateral movement, one of the mating ends of the sections being adjacent the narrower end of the thimble and the other mating end being oppositely disposed relative thereto, and means extending transversely of the sections at the tongues and detachably securing the sections together, said securing means being spaced inwardly from said rope receiving channels.

3. A split loop rope thimble comprising, two rope supporting sections, each section having an outwardly facing rope receiving channel therein, said sections being cooperable to form a thimble with sides converging toward one end of the thimble to provide a narrower end thereof, said sections having mating ends with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections and the tongue and slot having faces in transverse planes in angular relation and diverging outwardly of the rope receiving channel, one of the mating ends of the sections being adjacent the narrower end of the thimble and the other mating end being oppositely disposed relative thereto, and means extending transversely of the sections at the tongues and detachably securing the sections together, said securing means being spaced inwardly from said rope receiving channels.

4. A split loop rope thimble comprising, two rope supporting sections, each section having an outwardly facing rope receiving channel therein, said sections having mating ends with the rope receiving channels at said ends in registry and with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections being oppositely disposed on the thimble, said tongues having transverse bores registering with transverse bores in the other section adjacent the mating ends, said bores extending transversely relative to the rope receiving channel and spaced inwardly therefrom, and fastening means extending through the registering bores and engaging the section having the slots therein to retain the fastening means in said bores and the sections in assembled relation to form a loop thimble.

5. A split loop rope thimble comprising, two rope supporting sections, each section having an outwardly facing rope receiving channel therein, said sections having mating ends with the rope receiving channels at said ends in registry and with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections and the tongue and slot having faces in transverse planes in angular relation and diverging outwardly of the rope receiving channel, the mating ends of the sections being oppositely disposed on the thimble, said tongues having transverse bores registering with transverse bores in the other section adjacent the mating ends, said bores extending transversely relative to the rope receiving channel and spaced inwardly therefrom, and fastening means extending through the registering bores and engaging the section having the slots therein to retain the fastening means in said bores and the sections in assembled relation to form a loop thimble.

6. A split loop rope thimble comprising, two rope supporting sections, each section having an outwardly facing rope receiving channel therein, said sections being cooperable to form a loop thimble with sides converging toward one end of the thimble to provide a narrower end thereof, said sections having mating ends with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections and the tongue and slot having faces in transverse planes in angular relation and diverging outwardly of the rope receiving channel, one of the mating ends of the sections being adjacent the narrower end of the thimble and the other mating end being oppositely disposed relative thereto, said tongues having transverse bores registering with transverse bores in the other section adjacent the mating ends, said bores extending transversely relative to the rope receiving channel and spaced inwardly therefrom, and fastening means extending through the registering bores and engaging the section having the slots therein to retain the fastening means in said bores and the sections in assembled relation.

7. A split loop rope thimble comprising, two rope supporting sections, each section having an outwardly facing rope receiving channel therein, said sections being cooperable to form a loop thimble with sides converging toward one end of the thimble to provide a narrower end thereof, said sections having mating ends with a slot extending from a section end longitudinally of the respective rope receiving channel, a tongue extending from the other section end of the mating ends and into the respective slot, the free end of said tongue having mating engagement with the terminal end of the slot, said tongue and slot having engaging sides to retain the sections against relative lateral movement, the mating ends of the sections and the tongue and slot having faces in transverse planes in angular relation and diverging outwardly of the rope receiving channel, one of the mating ends of the sections being adjacent the narrower end of the thimble and the other mating end being oppositely disposed relative thereto, said tongues having transverse bores registering with transverse bores in the other section adjacent the mating ends, said bores extending transversely relative to the rope receiving channel and spaced inwardly therefrom, fastening means extending through the registering bores, means on the ends of the fastening devices engaging the section having the slots therein to retain the fastening means in said bores and the sections in assembled relation, and lugs on said sections extending outwardly at sides of the rope receiving channels and adapted to be bent over a rope in said channel.

References Cited in the file of this patent

UNITED STATES PATENTS 2,600,417      Morris _____ June 17, 1952